United States Patent
Yamada

(10) Patent No.: US 9,396,420 B2
(45) Date of Patent: Jul. 19, 2016

(54) IMAGE FORMING SYSTEM IN WHICH AN IMAGE FORMING APPARATUS HAVING AN ERROR EVENT OR A WARNING EVENT ENTERS A SLEEP MODE AND AN IMAGE FORMING APPARATUS NOT HAVING AN ERROR EVENT OR A WARNING EVENT REMAINS IN A NORMAL MODE SO THAT A USER CAN BE DIRECTED TO THE IMAGE FORMING APPARATUS WITH THE ERROR EVENT OR THE WARNING EVENT

(71) Applicant: KYOCERA Document Solutions Inc., Chuo-ku, Osaka-shi, Osaka (JP)

(72) Inventor: Yohei Yamada, Osaka (JP)

(73) Assignee: Kyocera Document Solutions Inc (JP)

( * ) Notice: Subject to any disclaimer, the term of this patent is extended or adjusted under 35 U.S.C. 154(b) by 0 days.

(21) Appl. No.: 14/584,696

(22) Filed: Dec. 29, 2014

(65) Prior Publication Data
US 2015/0193675 A1    Jul. 9, 2015

(30) Foreign Application Priority Data
Jan. 9, 2014    (JP) .................... 2014-002777

(51) Int. Cl.
| | | |
|---|---|---|
| G06K 15/00 | (2006.01) | |
| H04N 1/32 | (2006.01) | |
| G06K 15/02 | (2006.01) | |
| G03G 15/00 | (2006.01) | |

(52) U.S. Cl.
CPC .............. *G06K 15/408* (2013.01); *G03G 15/00* (2013.01); *G06K 15/1805* (2013.01); *G06K 15/402* (2013.01); *G06K 15/4055* (2013.01)

(58) Field of Classification Search
CPC ............ G06K 15/408; G06K 15/4055; G06K 15/402; H04N 1/32609; H04N 1/32694
USPC ........................................................ 358/1.15
See application file for complete search history.

(56) References Cited

U.S. PATENT DOCUMENTS

| | | | |
|---|---|---|---|
| 7,884,981 B2 * | 2/2011 | Mishima et al. ............... | 358/527 |
| 2009/0201558 A1 * | 8/2009 | Kida ............................... | 358/404 |
| 2012/0050808 A1 * | 3/2012 | Kamomae et al. ........... | 358/1.15 |
| 2012/0274980 A1 * | 11/2012 | Koike ........................... | 358/1.15 |

FOREIGN PATENT DOCUMENTS

| | | |
|---|---|---|
| JP | 2002-296983 | 10/2002 |
| JP | 2008-122917 | 5/2008 |

* cited by examiner

*Primary Examiner* — Eric A Rust

(57) ABSTRACT

An event detecting unit detects a specific error event or a specific warning event. An event notice transmitting unit transmits an event notice of the detected event to another image forming apparatus. An event notice receiving unit receives an event notice from another image forming apparatus. A status control unit is capable of changing the operation mode among a normal mode and a sleep mode. The status control unit changes the operation mode to the sleep mode or an out-of-service expression mode if the event notice is received in the normal mode. The out-of-service expression mode includes at least one of (a) putting off a light of the display device, (b) stopping a part or all of internal devices that make operation noise sound, and (c) denying reception of an execution request to a part or all of functions.

4 Claims, 3 Drawing Sheets

IMAGE FORMING SYSTEM IN WHICH AN IMAGE FORMING APPARATUS HAVING AN ERROR EVENT OR A WARNING EVENT ENTERS A SLEEP MODE AND AN IMAGE FORMING APPARATUS NOT HAVING AN ERROR EVENT OR A WARNING EVENT REMAINS IN A NORMAL MODE SO THAT A USER CAN BE DIRECTED TO THE IMAGE FORMING APPARATUS WITH THE ERROR EVENT OR THE WARNING EVENT

CROSS-REFERENCE TO RELATED APPLICATIONS

This application relates to and claims priority rights from Japanese Patent Application No. 2014-002777, filed on Jan. 9, 2014, the entire disclosures of which are hereby incorporated by reference herein.

BACKGROUND

1. Field of the Present Disclosure

The present disclosure relates to an image forming system and an image forming apparatus.

2. Description of the Related Art

An image forming apparatus has a normal mode and a sleep mode. When an error occurs such as empty of consumable goods or jam in the sleep mode, the image forming apparatus activates an operation panel and displays a message on the occurring error for informing it to a user. Some image forming apparatuses stop operation of the operation panel if the error is not released for a long time.

However, in an office, for example, where plural image forming apparatuses are placed, when an error occurs in one of them and a user's manual work is required to release the error, since such manual work is tiresome, a user tends to use another image forming apparatus in which no errors occur.

It is possible to display a message on the error or to emit auditory signal of the error. If such a means is used, the user nearest to the image forming apparatus in which errors occur often do manual work for releasing the errors even in a situation that plural users uses the plural image forming apparatuses, and therefore, such a means results in unfairness to the users.

SUMMARY

An image forming system according to an aspect of the present disclosure includes plural image forming apparatuses connected to each other through a network. Each one of the plural image forming apparatuses includes an operation unit, an event detecting unit, an event notice transmitting unit, an event notice receiving unit, and a status control unit. The operation unit includes a display device and an input device configured to detect a user operation. The event detecting unit is configured to detect a specific error event or a specific warning event. The event notice transmitting unit is configured to transmit an event notice to another image forming apparatus among the plural image forming apparatuses, the event notice indicating that the error event or the warning event was detected by the event detecting unit. The event notice receiving unit is configured to receive an event notice from another image forming apparatus among the plural image forming apparatuses, the event notice indicating that the error event or the warning event was detected in said another image forming apparatus. The status control unit is configured to be capable of changing an operation mode of this image forming apparatus from one to the other among a normal mode and a sleep mode. The status control unit is further configured to change the operation mode to the sleep mode or an out-of-service expression mode if the operation mode is the normal mode when the event notice is received by the event notice receiving unit. The out-of-service expression mode includes at least one of (a) putting off a light of the display device, (b) stopping a part or all of internal devices that make operation noise sound, and (c) denying reception of an execution request to a part or all of functions.

An image forming apparatus according to an aspect of the present disclosure includes an operation unit, an event detecting unit, an event notice transmitting unit, an event notice receiving unit, and a status control unit The operation unit includes a display device and an input device configured to detect a user operation. The event detecting unit is configured to detect a specific error event or a specific warning event. The event notice transmitting unit is configured to transmit an event notice to another image forming apparatus among predetermined plural image forming apparatuses, the event notice indicating that the error event or the warning event was detected by the event detecting unit. The event notice receiving unit is configured to receive an event notice from another image forming apparatus among the plural image forming apparatuses, the event notice indicating that the error event or the warning event was detected in said another image forming apparatus. The status control unit is configured to be capable of changing an operation mode of this image forming apparatus from one to the other among a normal mode and a sleep mode. The status control unit is further configured to change the operation mode to the sleep mode or an out-of-service expression mode if the operation mode is the normal mode when the event notice is received by the event notice receiving unit. The out-of-service expression mode includes at least one of (a) putting off a light of the display device, (b) stopping a part or all of internal devices that make operation noise sound, and (c) denying reception of an execution request to a part or all of functions.

These and other objects, features and advantages of the present disclosure will become more apparent upon reading of the following detailed description along with the accompanied drawings.

DETAILED DESCRIPTION

Hereinafter, an embodiment according to an aspect of the present disclosure will be explained with reference to drawings.

Figure 1:
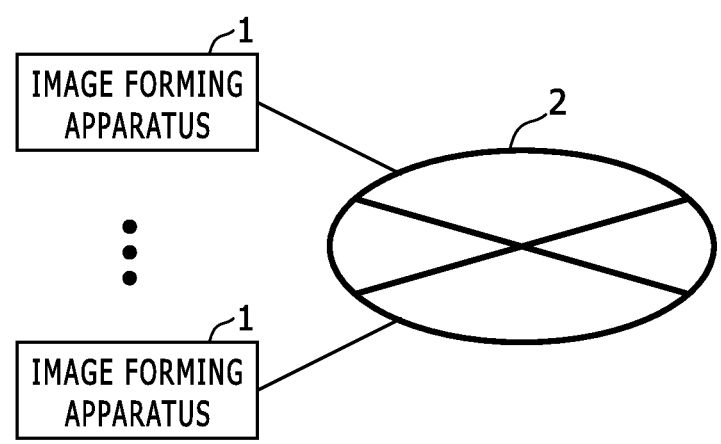
FIG. 1 shows a block diagram that indicates a configuration of an image forming system in an embodiment of the present disclosure.

FIG. 1 shows a block diagram that indicates a configuration of an image forming system in an embodiment of the present disclosure. In the system shown in FIG. 1, plural image forming apparatuses 1 are connected to a network 2. In this embodiment, the image forming apparatuses 1 are multi function peripherals. The network 2 is a local area network such as intranet using LAN (Local Area Network).

Figure 2:
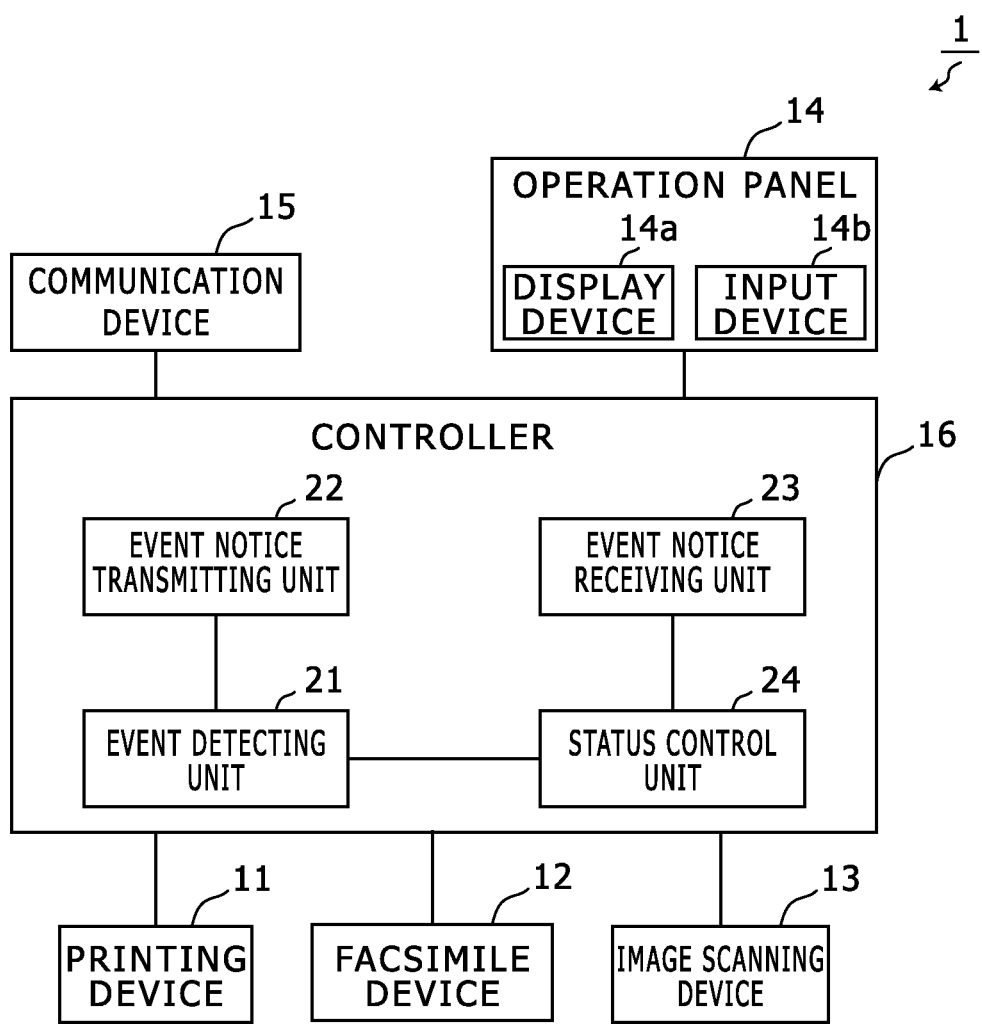
FIG. 2 shows a block diagram that indicates a configuration of an image forming apparatus 1 shown in FIG. 1.

FIG. 2 shows a block diagram that indicates a configuration of the image forming apparatus 1 shown in FIG. 1. As shown in FIG. 2, each one of the image forming apparatuses 1 includes a printing device 11, a facsimile device 12, an image scanning device 13, an operation panel 14, a communication device 15, and a controller 16.

The printing device 11 is an internal device that prints each image based on print image data on a paper sheet using electrophotography.

The facsimile device 12 is an internal device that transmits and receives an image as a facsimile signal through a public telephone line using a modem.

The image scanning device 13 is an internal device that scans a document image of a document and generates image data of the document image.

The operation panel 14 is disposed on the case surface of the image forming apparatus 1, and includes a display device 14a that displays information to a user and an input device 14b that receives a user operation. For example, a liquid crystal display is used as the display device 14a. A key switch, a touch panel or the like is used as the input device 14b.

The communication device 15 is a circuit that is connected to the network and performs data communication with another apparatus (e.g. another image forming apparatus 1) connected to the network 2. For example, a network interface is used as the communication device 15.

The controller 16 includes a CPU (Central Processing Unit), a ROM (Read Only Memory), and a RAM (Random Access Memory), loads a program from the ROM or the like to the RAM, and executes the program with the CPU to embody various processing units. In this embodiment, in the controller 16, an event detecting unit 21, an event notice transmitting unit 22, an event notice receiving unit 23, and a status control unit 24 are embodied.

The event detecting unit 21 detects a specific error event or a specific warning event using sorts of sensors (not shown). The error event includes empty of consumable goods such as printing paper sheet, jam of printing paper sheet, and the like. The warning event includes that residual amount of consumable goods such as printing paper sheet becomes equal to or less than a predetermined threshold value, and the like.

Further, the event detecting unit 21 detects release of the error event or the warning event.

The event notice transmitting unit 22 transmits an event notice to another image forming apparatus 1 among predetermined plural image forming apparatuses 1 using the communication device 15. This event notice indicates that the error event or the warning event was detected by the event detecting unit 21.

Further, the event notice transmitting unit 22 transmits an event release notice to another image forming apparatus 1 among the plural image forming apparatuses 1 using the communication device 15. This event release notice indicates that release of the error event or the warning event was detected by the event detecting unit 21.

The event notice receiving unit 23 receives an event notice from another image forming apparatus 1 among the plural image forming apparatuses 1 using the communication device 15. This event notice indicates that the error event or the warning event was detected in this another image forming apparatus 1.

Further, the event notice receiving unit 23 receives an event release notice from another image forming apparatus among the plural image forming apparatuses 1 using the communication device 15. This event release notice indicates that release of the error event or the warning event was detected in this another image forming apparatus 1.

The status control unit 24 is capable of changing the operation mode of this image forming apparatus 1 from one to the other among a normal mode and a sleep mode. In the sleep mode, the status control unit 24 stops all operations other than the input device 14b, the facsimile device 12, the communication device 15, the controller 16 (i.e. stops all operations other than standby operations for receiving a user operation, network communication and facsimile communication) in order to reduce electricity consumption. Therefore, in the sleep mode, a light in the display device 14a of the operation panel 14 is put off, and driving units that make operation noise sound (e.g. motors in the printing device 11 and the image scanning device 13, a cooling fan in this image forming apparatus 1 and the like) are stopped.

In the sleep mode, since power supply to a heater of a fuser is also cut off in the printing device 11, a time length in a range from a few tens of seconds to a few minutes is required for the image forming apparatus 1 to return from the sleep mode to the normal mode and become available. Consequently, if a user wants to use an image forming apparatus 1 immediately, the user passes by an image forming apparatus 1 in the sleep mode and goes to an image forming apparatus 1 in the normal mode that the user can use immediately.

If the operation mode is the sleep mode when the error event or the warning event is detected by the event detecting unit 21, then the status control unit 24 changes the operation mode to the normal mode.

Further, if the operation mode is the normal mode when the event notice is received by the event notice receiving unit 23, then the status control unit 24 changes the operation mode the sleep mode or an out-of-service expression mode.

The out-of-service expression mode includes at least one of (a) putting off a light of the display device 14a, (b) stopping a part or all of internal devices that make operation noise sound, and (c) denying reception of an execution request to a part or all of functions.

Thus, the out-of-service expression mode is an operation mode that simulates the sleep mode so as to cause a user to visually and aurally recognize that the image forming apparatus is in the sleep mode. Therefore, the other part of out-of-service expression mode may be the same as the normal mode.

In order to deny reception of an execution request to a part of functions (copy, facsimile transmission or the like), for example, it should be configured so as to disable a user operation to the operation panel 14 for selecting such a function. In order to deny reception of an execution request to all functions, for example, it should be configured so as to detect no user operations to the operation panel 14.

Further, the status control unit 24 changes the operation mode to the normal mode when the event release notice is received by the even notice receiving unit 23. However, if an event notice was received from an image forming apparatus 1 other than the sender of this event release notice but an event release notice has not been received from this image forming apparatus 1, the status control unit 24 does not change the operation mode to the normal mode, and keeps the sleep mode. Consequently, if error events or warning events occur in plural other image forming apparatuses 1, this image forming apparatus 1 still stays in the sleep mode until the error or warning events are released in all of the other image forming apparatuses 1.

Further, the status control unit 24 does not change the operation mode to the sleep mode nor the out-of-service expression mode, even if the event notice is received by the event notice receiving unit 23, until release of the error event or the warning event is detected by the event detecting unit 21 after the operation mode was changed to the normal mode on the basis of the detection of the error event or the warning event. Consequently, if an error event or a warning event is detected in another image forming apparatus 1 in addition to this image forming apparatus 1, this image forming apparatus 1 still stays in the normal mode.

Figure 3:
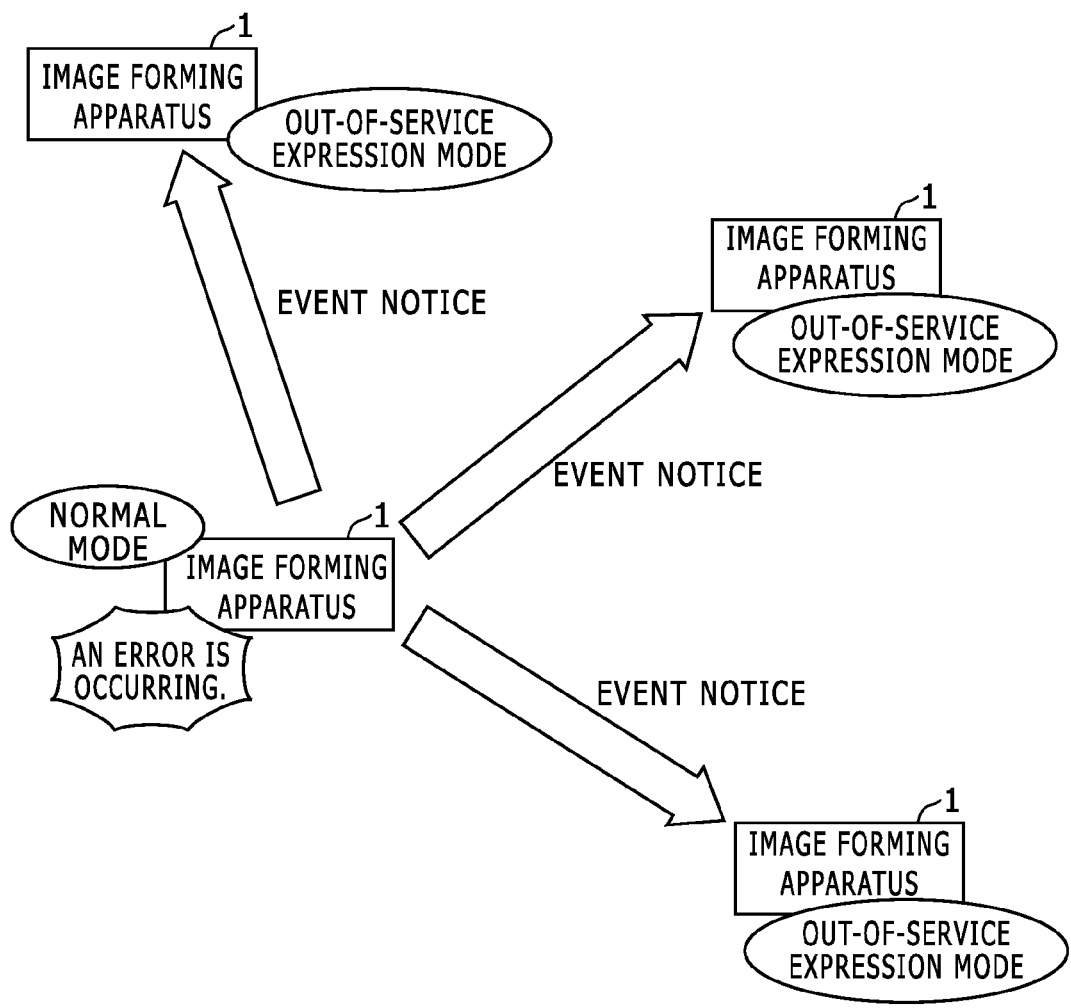
FIG. 3 shows a diagram that explains a behavior of an image forming apparatus in the system shown in FIG. 1.

The following part explains a behavior of an image forming apparatus in the aforementioned system. FIG. 3 shows a diagram that explains a behavior of an image forming apparatus in the system shown in FIG. 1.

In one of the image forming apparatuses 1, if the event detecting unit 21 detects an error event or a warning event, then the event notice transmitting unit 22 transmits an event notice to other image forming apparatuses 1, and the status control unit 24 sets the operation mode to the normal mode.

On the other hand, in each one of the other image forming apparatuses 1, the event notice receiving unit 23 receives the transmitted event notice, and the status control unit 24 sets the operation mode to the sleep mode or the out-of-service expression mode.

In the current status, only the image forming apparatus 1 in which the error event or the warning event is occurring stays in the normal mode and all of the other image forming apparatuses 1 stay in the sleep mode or the out-of-service expression mode.

Therefore, a user who wants to use an image forming apparatus 1 passes by the image forming apparatus 1 recognized by the user as an image forming apparatus that stays in the sleep mode and the user can not use immediately (i.e. the image forming apparatus 1 in the sleep mode or the out-of-service expression mode), goes to the image forming apparatus 1 in which the error event or the warning event is occurring, finds that the error event or the warning event is occurring, and does manual work for release the error event or the warning event (e.g. supplying printing paper sheets, replacing a toner container, or removing a jammed paper sheet).

When the user does such a manual work, the event detecting unit 21 in the image forming apparatus 1 that the error event or the warning event occurred detects the release of the error event or the warning event.

If the release of the error event or the warning event is detected, the event notice transmitting unit 22 transmits an event release notice to the other image forming apparatuses 1.

In the other image forming apparatuses 1 that stay in the sleep mode based on the event notice, when the event notice receiving unit 23 receives this event release notice, the status control unit 24 returns the operation mode to the normal mode. If the image forming apparatus 1 received the event notice in the sleep mode, the status control unit 24 thereof may keep the sleep mode.

In the aforementioned embodiment, the event detecting unit 21 detects a specific error event or a specific warning event, and the event notice transmitting unit 22 transmits an event notice to another image forming apparatus 1 among predetermined plural image forming apparatuses 1. This event notice indicates that the error event or the warning event was detected by the event detecting unit 21. Further, the event notice receiving unit 23 receives an event notice from another image forming apparatus 1 among the plural image forming apparatuses 1. This event notice indicates that the error event or the warning event was detected in this another image forming apparatus 1. The status control unit 24 changes the operation mode to the sleep mode or an out-of-service expression mode if the operation mode is the normal mode when the event notice is received by the event notice receiving unit 23. The out-of-service expression mode includes at least one of (a) putting off a light of the display device 14a, (b) stopping a part or all of internal devices that make operation noise sound, and (c) denying reception of an execution request to a part or all of functions.

Consequently, only the image forming apparatus 1 in which the error event or the warning event is occurring stays in the normal mode and all of the other image forming apparatuses 1 stay in the sleep mode or the out-of-service expression mode, and therefore, a user who wants to use an image forming apparatus is directed toward the image forming apparatus in which the error event or the warning event is occurring. Therefore, a user who more frequently uses the image forming apparatuses 1 more frequently does manual work for releasing an error event or a warning event.

It is enabled to cause users fairly to do manual work for releasing error.

The description has been presented for purposes of illustration and description, and is not intended to be exhaustive or limited.

For example, in the aforementioned embodiment, if the out-of-service expression mode includes denying reception of an execution request to a part or all of functions, it may be configured so that the event notice transmitting unit 22 transmits an operation detection notice to another image forming apparatus 1 if a user operation is detected by the input device 14b after transmitting the event notice; the event notice receiving unit 23 receives an operation detection notice from another image forming apparatus 1 among the plural image forming apparatuses 1, and the operation detection notice indicates that a user operation was detected after detecting the error event or the warning event in this another image forming apparatus 1; and the status control unit 24 releases denying the reception if the operation detection notice was received by the event notice receiving unit 23.

Further, in the aforementioned embodiment, for example, the notices are transmitted as traps of SNMP (Simple Network Management Protocol).

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming system, comprising:
   plural image forming apparatuses connected to each other through a network;
   wherein each one of the plural image forming apparatuses comprises:
      an operation unit that includes a display device and an input device configured to detect a user operation;
      an event detecting unit configured to detect an error event or a warning event;
      an event notice transmitting unit configured to transmit an event notice to each of the plural image forming apparatuses, the event notice indicating that the error event or the warning event was detected by the event detecting unit;
      an event notice receiving unit configured to receive an event notice from another image forming apparatus among the plural image forming apparatuses, the event notice indicating that the error event or the warning event was detected in said another image forming apparatus; and a status control unit configured to change an operation mode of it's own image forming apparatus from one to the other among a normal operation mode and a sleep mode;

wherein each status control unit of the plural image forming apparatuses is configured to change the operation mode of their respective image forming apparatus to the sleep mode when the event notice is received by the event notice receiving unit of their respective image forming apparatus, and the image forming apparatus that transmitted the event notice is configured to remain in the normal operation mode after the event notice is transmitted, so that a user will be directed to the image forming apparatus in which the error event or warning event was detected;

wherein each event detecting unit of the plural image forming apparatuses is further configured to detect that the error event or the warning event was released;

wherein each event notice transmitting unit of the plural image forming apparatuses is further configured to transmit an event release notice to another image forming apparatus among the plural image forming apparatuses, the event release notice indicating that release of the error event or the warning event was detected by the event detecting unit that detected the event;

wherein each event notice receiving unit of the plural image forming apparatuses is further configured to receive an event release notice from another image forming apparatus among the plural image forming apparatuses, the event release notice indicating that release of the error event or the warning event was detected in said another image forming apparatus; and wherein each status control unit of the plural image forming apparatuses is further configured to change the operation mode from the sleep mode to the normal operation mode of their respective image forming apparatus when the event release notice is received by the event notice receiving unit of their respective image forming apparatus.

2. An image forming apparatus, comprising:

an operation unit that includes a display device and an input device configured to detect a user operation;

an event detecting unit configured to detect an error event or a warning event;

an event notice transmitting unit configured to transmit an event notice to each image forming apparatus among predetermined plural image forming apparatuses, the event notice indicating that the error event or the warning event was detected by the event detecting unit;

an event notice receiving unit configured to receive an event notice from another image forming apparatus among the plural image forming apparatuses, the event notice indicating that the error event or the warning event was detected in said another image forming apparatus; and a status control unit configured to change an operation mode from one to the other among a normal operation mode and a sleep mode;

wherein the status control unit is further configured to change the operation mode to the sleep mode from the normal operation mode when the event notice is received by the event notice receiving unit;

wherein each status control unit of the image forming apparatuses among the predetermined plural image forming apparatuses is configured to change the operation mode to the sleep mode of their respective image forming apparatus when the event notice is received by their respective image forming apparatus, and the image forming apparatus that transmitted the event notice is configured to remain in the normal operation mode after the event notice is transmitted, so that a user will be directed to the image forming apparatus in which the error event or warning event was detected;

wherein the event detecting unit is further configured to detect that the error event or the warning event was released;

the event notice transmitting unit is further configured to transmit an event release notice to another image forming apparatus among the plural image forming apparatuses, the event release notice indicating that release of the error event or the warning event was detected by the event detecting unit;

the event notice receiving unit is further configured to receive an event release notice from another image forming apparatus among the plural image forming apparatuses, the event release notice indicating that release of the error event or the warning event was detected in said another image forming apparatus; and the status control unit is further configured to change the operation mode from the sleep mode to the normal operation mode when the event release notice is received by the event notice receiving unit.

3. The image forming apparatus according to claim 2, wherein the status control unit is further configured not to change the operation mode to the sleep mode, even if the event notice is received by the event notice receiving unit, until release of the error event or the warning event is detected by the event detecting unit after the operation mode was changed to the normal operation mode on the basis of the detection of the error event or the warning event.

4. The image forming apparatus according to claim 2, wherein:

the event notice transmitting unit is further configured to transmit an operation detection notice to said another image forming apparatus if a user operation is detected by the input device after transmitting the event notice; and the event notice receiving unit is further configured to receive an operation detection notice from another image forming apparatus among the plural image forming apparatuses, the operation detection notice indicating that a user operation was detected after detecting the error event or the warning event in said another image forming apparatus.

* * * * *